May 5, 1953

D. A. WALLACE 2,637,522

VEHICLE HOISTING APPARATUS

Filed Aug. 19, 1948

INVENTOR.
David A. Wallace
BY
Robert E. Harris
ATTORNEY.

May 5, 1953
D. A. WALLACE
2,637,522
VEHICLE HOISTING APPARATUS
Filed Aug. 19, 1948
3 Sheets-Sheet 2
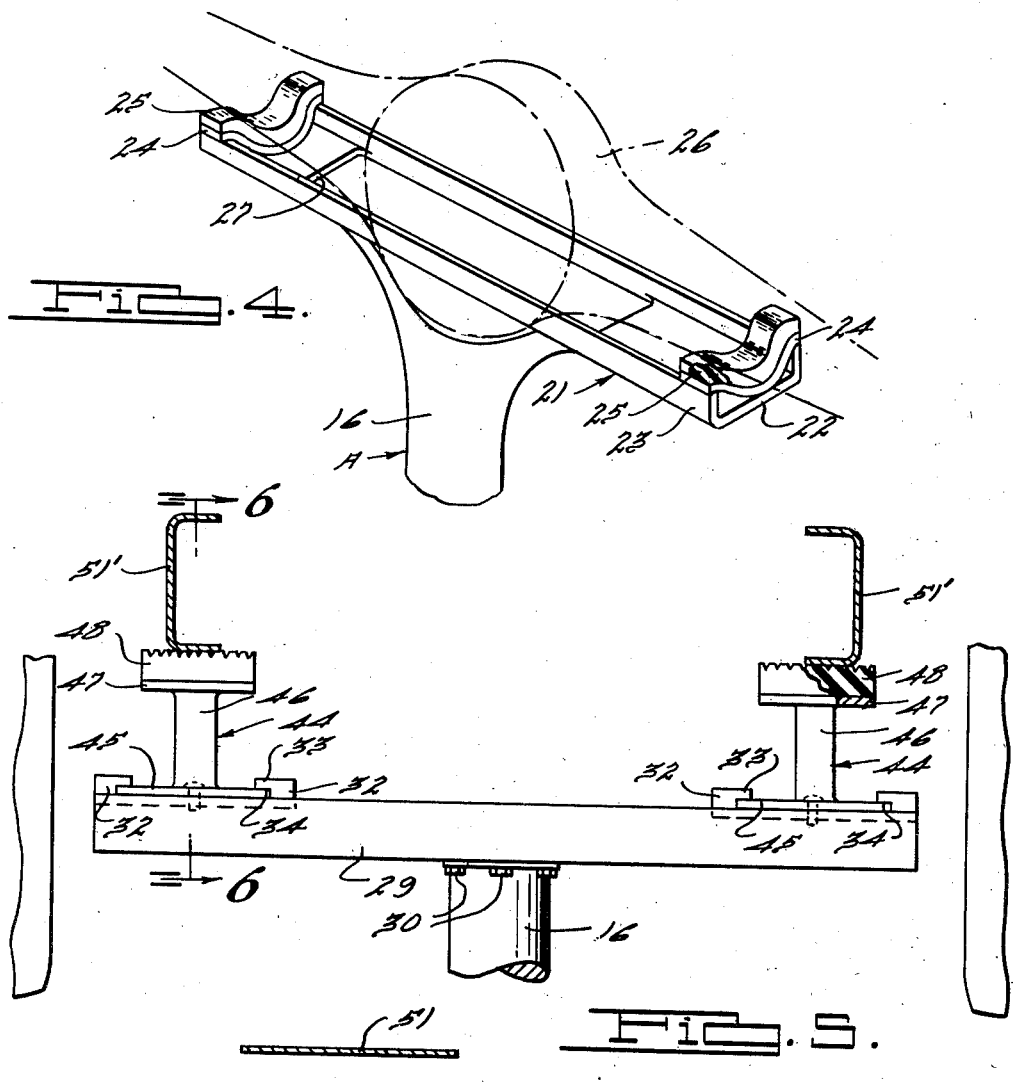
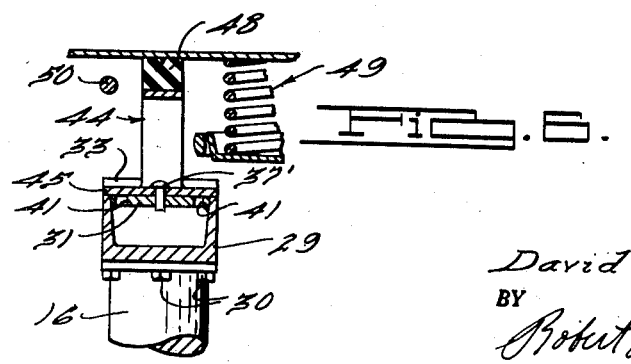
INVENTOR.
David A Wallace.
BY
Robert E. Harris
ATTORNEY May 5, 1953  D. A. WALLACE  2,637,522
VEHICLE HOISTING APPARATUS
Filed Aug. 19, 1948  3 Sheets-Sheet 3

INVENTOR.
David A. Wallace.
BY Robert E. Harris
ATTORNEY

Patented May 5, 1953

2,637,522

UNITED STATES PATENT OFFICE 2,637,522

VEHICLE HOISTING APPARATUS

David A. Wallace, Grosse Pointe Farms, Mich., assignor to Walco, Inc., Detroit, Mich., a corporation of Michigan Application August 19, 1948, Serial No. 45,107

5 Claims. (Cl. 254—89)

This invention relates to improvements in vehicle hoisting apparatus.

More particularly the invention pertains to improved vehicle supporting seat structures for vehicle hoisting apparatus.

One of the main objects of the invention is to provide supporting seat structures of this kind which may be applied to a plurality of different portions of a large variety of vehicles of different constructions and wheel bases.

Another object of the invention is to provide non-metallic yieldable, slip resisting load receiving elements in a supporting seat structure which substantially uniformly distributes the load reaction on an irregular surface of the vehicle to which it is applied, in order to guard against injury to protruding portions of such surface and chipping and abrading of the paint thereof which would otherwise result from concentrated load applications on portions of such surface.

A still further object of the invention is to provide selectively adjustable vehicle contacting elements in load receiving seat structures of this kind which can be conveniently shifted in the direction of the length of a vehicle and/or transversely of the length of the vehicle to be hoisted in order to accommodate lifting of vehicles within a wide wheel base range and by engagement with a variety of parts of the vehicle without requiring adjustment of an entire hoisting unit of the hoisting apparatus.

Another object of the invention is to provide a load receiving seat structure of this kind to which may be conveniently applied a plurality of different vehicle contacting elements in a variety of different positions in order to accommodate lifting of a large range of vehicles of different constructions and wheel bases.

Illustrative embodiments of the invention are shown in accompanying drawings, in which:

Fig. 4 is a perspective view of the rear load receiving seat structure of the hoisting unit illustrated at the left end portion of Fig. 1.

Fig. 5 is a fragmentary front elevational view, partly in section, showing vehicle front end hoisting apparatus similar to that shown in Fig. 2, but embodying a modification of my invention.

Fig. 6 is fragmentary sectional view taken on the line 6—6 of Fig. 5.

Figure 1:
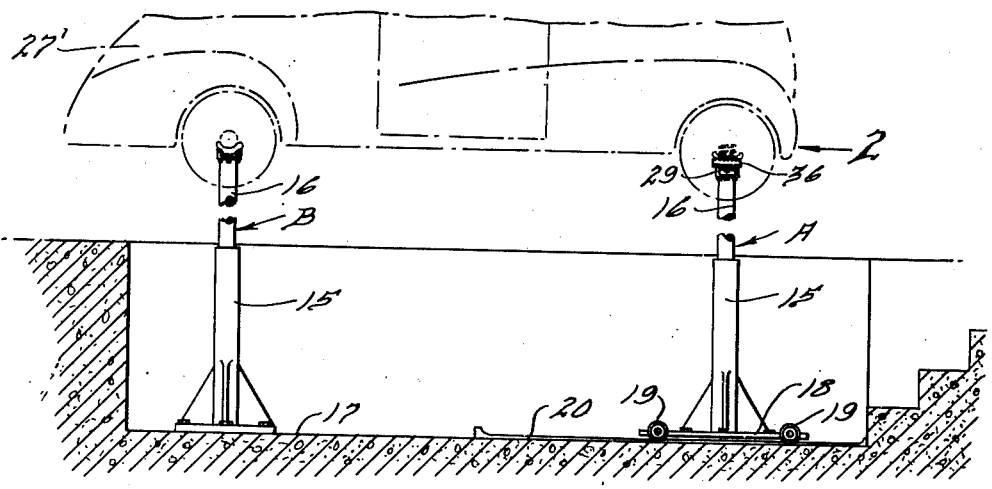
Fig. 1 is a side elevational view, partly in section of vehicle hoisting apparatus embodying the invention.

In Fig. 1 of the drawings is illustrated an application of one form of my improved load receiving seat structure to vehicle hoisting apparatus of the type which includes front and rear hoisting units A and B. Each of these hoisting units is merely representative of the type of vehicle hoisting apparatus with which my improved load receiving seat structure may be advantageously employed. This seat structure may be employed with equal advantage in hoisting apparatus of various types including those set forth in my copending applications Serial Nos. 653,386, 711,649, 775,191, 34,772, filed March 9, 1946, November 22, 1946, September 20, 1947, and June 23, 1948, respectively and now Patents Nos. 2,576,907, 2,576,158, 2,576,908 and 2,598,200, respectively and also my copending application 15,827 filed November 19, 1948.

Each hoisting unit A and B shown in Fig. 1 includes a lower cylinder portion 15 in which is slidably disposed a piston 16. Elevation of the pistons 16 is produced in a conventional manner, not shown, by a fluid pressure system. The cylinder 15 of the rear hoisting unit is stationarily mounted on the floor 17 of the pit. The front unit A is shiftably carried by a carriage 18 having wheels 19 supported on tracks 20 which are fixed to the floor 17 of the pit.

Mounted on the upper extremity of the piston 16 of the rear hoisting unit B is a load receiving support structure, generally designated by the numeral 21 which includes a channel member 22 having upwardly extending side flanges 23 which is adapted to extend transversely of the vehicle. Mounted on each end portion of the channel member 22 is a rear axle housing engaging weight support which includes a bowed metal plate 24 having a relatively thick rubber pad 25 surface bonded to its upper side. The rubber pads of these weight supporting elements conform to the bowed construction of their respective metal plates 24 and provide concave notches for receiving and accurately positioning the rear axle housing 26 of a vehicle 27', shown in Fig. 1, with respect to the hoisting apparatus. The rubber pads are of sufficient thickness and of such yieldable character as to readily deform in accommodating irregularities on the surface portions of the axle housing 26 with which they contact, thus avoiding injury to welded seams of the housing and other protruding elements thereon. The rubber pads frictionally resist unintended shifting of the axle housing and protect the painted surfaces thereof against injury. The channel member 22 has an opening 27 in its web portion for accommodating the banjo portion of the axle housing 26.

Mounted on the upper end of the piston 16 of the front unit A is a weight receiving seat structure, generally designated by the numeral 28, which also comprises a channel member 29 having upwardly extending side flanges. The channel member 29 is fixed at its intermediate portion to the upper end of the piston 16 by bolts 30. Mounted in the upper open side of the channel member 29 at each opposite end portion thereof respectively, is a plate 31 which is disposed between the side flanges of the channel member and preferably welded thereto. The edge portions 32 of each plate 31 which extend transversely of the channel member 29, project upwardly above the latter and they are provided with inwardly extending flanges 33 which project over the plate to provide grooves 34 extending transversely of the channel member 29.

Slidably mounted on each plate 31 is a weight supporting element which includes a rigid plate member 35 having its edge portions engaged in the grooves 34 and on which is surface bonded a relatively thick rubber pad 36. The pad 36 has the same characteristics as the rubber pads 25 above described except that it is flat and its upper surface may be serrated, as shown in the drawings. The upper surface may be smooth if desired. Each rubber pad 36 and its supporting plate 35 is bodily shiftable longitudinally of a vehicle to be hoisted and may be releasably locked in any one of three positions by a pin 37 having its head disposed in a recess 38 formed in the upper side of the pad 36 and its shank portion 39 extending through registered openings 40 and 41 in the plate 35 and the fixed plate 31, respectively. There are three openings 41 in the plate 31 which aligned with the length of the vehicle to be lifted and more or differently located apertures 41 may, if desired, be provided in the plate 31. The pin 37 may be lifted and reset to bring the rubber pad 36 into contacting registration with the spring pad 42 of a vehicle spring suspension, generally designated by the numeral 43, or with any other selected portion of the vehicle. The rubber pad 36 has an upper surface of substantial area and it is movable forwardly and rearwardly of a vehicle to be hoisted throughout a substantial distance, thereby conditioning it to be applied to a plurality of different makes and models of vehicles having a wide range of wheel bases and a wide variety of constructions. Thus many different makes and sizes of vehicles can be lifted by merely shifting the weight supporting elements comprising the rubber pads 36 and without moving the entire hoisting unit A. The rubber pads 36 readily deform to accommodate irregularities on the surfaces which they contact and protect such irregularities and elements such as nuts, bolts, rivets, flanges and the like and other structural parts beneath a vehicle from injury. It therefore follows that the load supporting seat structure 28 need not be placed with accurate precision in order to protect the structure underneath a vehicle from injury.

Figure 2:
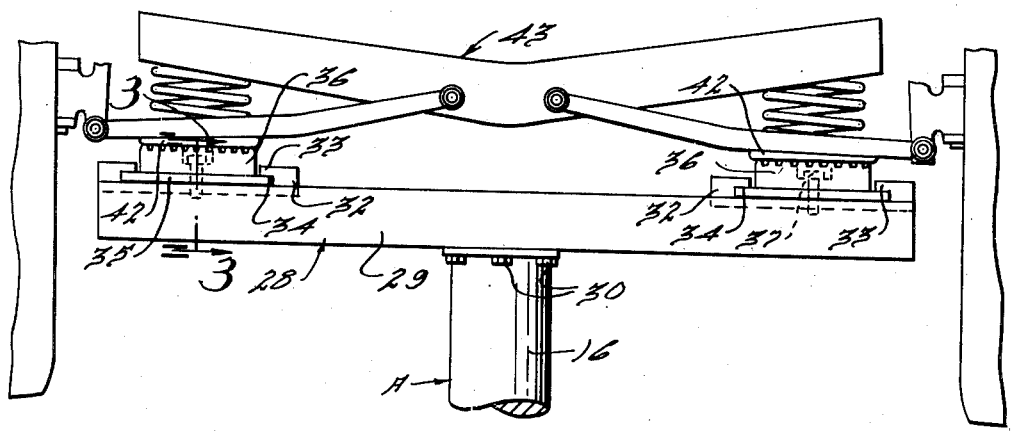
Fig. 2 is a fragmentary front end elevational view showing the hoisting apparatus as viewed in the direction of the arrow 2 in Fig. 1.

In the form of the invention shown in Figs. 5 and 6, the channel member 29, plates 31 and their edges and flange portions 32 and 33, respectively are identical to the corresponding structure shown in Fig. 2. In place of the plates 35 and pads 36, shown in Fig. 2, pedestals, generally designated by the numeral 44, are slidably mounted in the grooves 34. Each pedestal 44 includes a base plate portion 45 having opposite edges disposed in the grooves 34, and intermediate upstanding post portions 46 and a horizontal rigid seat 47, all of which preferably comprise metal. A relatively elongated, narrow pad 48 comprising non-metallic yieldable material such as rubber is bonded by vulcanization or fixed in any suitable manner to the horizontal seat portion 47. As illustrated in Fig. 6, the post and pad portions 46 and 48, respectively, are of such dimensions as to conveniently fit between the spring supporting structure 49 of the front end suspension and the tie rod mechanism 50 of the steering system of a vehicle and to engage the chassis frame structure 51' thereof. When a vehicle is supported upon the posts 44 the sprung portion at the front end of the vehicle is freely suspended from the chassis frame thus making it available for adjustment and repair. In applying the posts 44 to some vehicles it is merely necessary to shift the posts relative to the channel member 29 and fix them in position by suitably placing a pin 37 which extends through an aperture in each base plate 45 and is receivable in any one of the apertures 41 in each plate 31. If further adjustment of the posts 44 is required the entire front hoisting unit A may be shifted upon its track 20. The combined adjustment of the posts 44 relative to the channel member 29 and of the hoisting unit A permits the rubber pads 48 to be conveniently applied to vehicles of a number of different makes, constructions and wheel bases.

Figure 7:
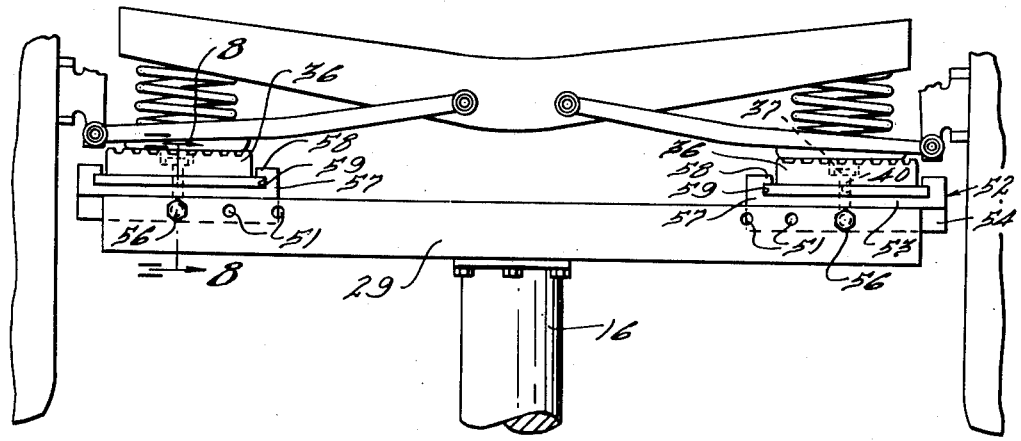
Fig. 7 is a view similar to Fig. 2, but showing a further modification of the invention.

In the form of the invention illustrated in Fig. 7 the channel member 29 is identical to that shown in Figs. 2 and 5 except that it is provided adjacent its end portions with a plurality of aligned apertures 51 formed in the opposite side flanges thereof in transverse alignment with each other. Mounted on each end of the channel member 29 is an intermediate support member, generally designated by the numeral 52. Each intermediate support member 52 includes a plate-like body portion 53 from which depend spaced flanges 54 which lie adjacent the inner faces of the side flanges of the channel 29. The flanges 54 are provided with aligned apertures 55 which register with the apertures 51 in the side flanges of the channel member 29. A bolt 56 is adapted to be disposed through the apertures 55 of the flanges 54 and through selected apertures 51 of the side flanges of the channel member 29 to releasably hold the intermediate support 52 at each end of the channel member 29 in an adjusted position with respect to the length of the channel member 29 and thus with respect to the width of the vehicle.

Figure 3:
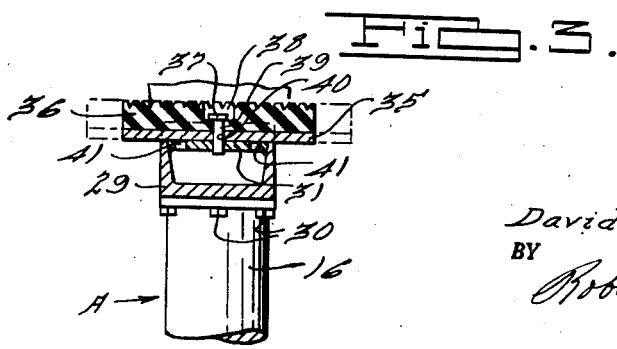
Fig. 3 is a fragmentary sectional view taken on line 3—3 of Fig. 2.
Figure 8:
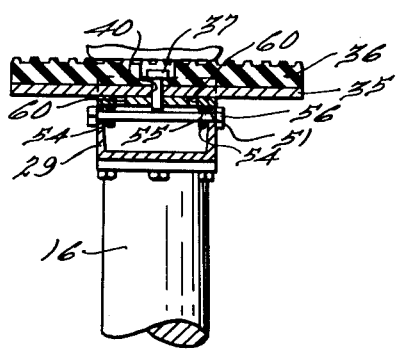
Fig. 8 is a fragmentary sectional view taken on line 8—8 of Fig. 7.

Each intermediate support 52 has upwardly extending thickened edge portions 57 which are provided with inwardly extending flanges 58. The flanges 58 form the upper boundary of grooves 59 provided between the flanges 58 and the plate-like body portion 53 of the intermediate support member. A vehicle contacting element identical to that shown in Figs. 2 and 3 and comprising a rigid plate 35 is slidably mounted on each intermediate support member 52 for movement longitudinally of a vehicle to be hoisted. The edge portions of each plate 35 which extend transversely of the channel member 29 are received in the grooves 59 of one intermediate support member 52, and a rubber pad 36 is fixed to the upper side of each plate 35 as in the structure shown in Figs. 2 and 3. The rubber pads at the opposite ends of the channel member of the form of the invention shown in Figs. 7 and 8 are adapted to engage the spring pads or other selected structures at the front end of the vehicle and may be adjusted both longitudinally and transversely of a vehicle so as to be universally applied to a large number of different makes, constructions and sizes of vehicles. The vehicle contacting rubber pads of this form of the invention may be releasably held in an adjusted position longitudinally of the vehicle by a pin 37 which extends through an aperture 40 in the plate 35 and which is selectively receivable in apertures 60 formed in the plate like body portion 53 of the intermediate support 52. All of the advantages and functions of the rubber pads set forth in the discussion of Figs. 1 to 6, also apply with respect to the rubber pads included in the form of the invention shown in Figs. 7 and 8.

It should be noted that the post type vehicle contacting members 44 shown in Fig. 5, may, if desired be supported for both longitudinal and transverse adjustments relative to a vehicle, by merely removing the rubber pads 36 and their base plates 35 from the intermediate supports 52 of the form of the invention shown in Figs. 7 and 8, and replacing the post type vehicle contacting members in the grooves of the intermediate supports 52. This can be easily accomplished by constructing the plates 45 and 35 to the same dimensions.

Although but several specific embodiments of the invention are herein shown and described, it will be understood that various changes in the design, sequence of operation and materials employed may be made without departing from the spirit of the invention.

I claim:

1. A load receiving seat structure for vehicle hoisting apparatus comprising a base portion, a weight supporting member shiftably mounted on said base structure for movement in the direction of the length of a vehicle including a plate element and a non-metallic yieldable vehicle contacting element fixed thereto and movable into projecting relationship beyond the lateral extremities of said base portion, said plate element having opposite edge portions projecting beyond said yieldable vehicle contacting element and extending in said direction of movement, mounting means on said base portion having flanges overlapping said opposite edge portions of said plate element for holding said weight supporting member against displacement from said base portion when said yieldable element is extended beyond the lateral extremities of said base portion and weight is applied on a portion of said yieldable element beyond said extremities, said yieldable vehicle contacting element having portions confined between said flanges, and means coacting between said plate element and said base structure for positively holding said weight supporting member in a selected one of a plurality of positions.

2. A load receiving seat structure for vehicle hoisting apparatus comprising a base portion having a support element extending transversely of the length of a vehicle, means on said transversely extending support element providing a channel extending in the direction of the length of a vehicle and having spaced inwardly extending flanges restricting its open upper extremity, a weight supporting member shiftably mounted directly on said support element including a rigid plate element slidably mounted in said channel having edge portions engaged beneath said flanges and a non-metallic yieldable vehicle contacting element confined between said flanges and fixed to said rigid plate element and extending outwardly from said channel through its restricted upper extremity, and means for positively holding said weight supporting member in a selected one of a plurality of positions spaced along said channel.

3. A load receiving seat structure for vehicle hoisting apparatus comprising a base portion adapted to extend transversely beneath a vehicle, means on said base portion providing a channel extending in the direction of the length of a vehicle and having a restricted open upper extremity and a rigid bottom wall, a weight supporting member shiftably mounted on said base portion including a rigid plate element and a yieldable vehicle contacting element fixed thereto and provided with a recess open at its upper side, said plate element and said rigid bottom wall of said channel having longitudinally spaced apertures registerable with each other at selected positions of said weight supporting member and base portion, and a pin having a head confined within said recess and a shank receivable in said registering apertures for releasably locking said weight supporting member in a selected position.

4. A load receiving seat structure for vehicle hoisting apparatus, comprising an elongated base portion adapted to extend transversely of a vehicle, means on each respectively opposite end portion of said base portion providing a channel extending transversely of said base portion and having a rigid bottom wall, a weight supporting member shiftably mounted on each end of said base portion each including a rigid plate element shiftably engaged in one of said channels respectively and extending beyond the lateral extremities of said base portion, and a rubber pad fixed on and longitudinally coextensive with each plate element for contacting structure at opposite side portions of a vehicle, and means for coacting between the bottom wall of each channel and one of said plate elements for releasably fixing said weight supporting members in selected positions.

5. A load receiving seat structure for vehicle hoisting apparatus comprising a channel shaped base portion having upwardly extending side flanges, an intermediate support member shiftably mounted on said base portion for movement in a direction parallel to one of the major axis of a vehicle and including downwardly extending flanges disposed adjacent the side flanges of said base portion, means for coacting with adjacent side flanges of said base portion and intermediate support member for holding the latter in a selected position, a weight supporting member shiftably mounted on said intermediate support member for movement transversely of said axis including a vehicle contacting element comprising a relatively thick and yieldable rubber-like pad of greater length than the width of said base portion, and means for releasably holding said weight supporting member in a selected position relative to said intermediate support member, said means being constructed and arranged to at all times maintain in alignment with said base portion a portion of said weight supporting member at least equal in dimension to the width of said base portion.

DAVID A. WALLACE.

References Cited in the file of this patent

UNITED STATES PATENTS

| Number | Name | Date |
|---|---|---|
| 1,784,554 | Stukenborg | Dec. 9, 1930 |
| 1,896,715 | Martinetti | Feb. 7, 1933 |
| 2,012,430 | Kuhlman | Aug. 27, 1935 |
| 2,015,357 | Weaver | Sept. 24, 1935 |
| 2,045,173 | Baird | June 23, 1936 |
| 2,158,399 | Carter | May 16, 1939 |
| 2,423,954 | Thompson | July 15, 1947 |
| 2,458,986 | Frey | Jan. 11, 1949 |

FOREIGN PATENTS

| Number | Country | Date |
|---|---|---|
| 102,479 | Australia | Nov. 10, 1937 |